United States Patent
Tschirhart et al.

(10) Patent No.: US 11,594,961 B2
(45) Date of Patent: Feb. 28, 2023

(54) POWER SUPPLY SYSTEM AND CONTROL IN A DYNAMIC LOAD CONFIGURATION

(71) Applicant: Infineon Technologies Austria AG, Villach (AT)

(72) Inventors: Darryl Tschirhart, Cambridge (CA); Danny Clavette, Greene, RI (US)

(73) Assignees: Infineon Technologies Austria AG, Villach (AT); Cypress Semiconductor (Canada), Inc., Toronto (CA)

(*) Notice: Subject to any disclaimer, the term of this patent is extended or adjusted under 35 U.S.C. 154(b) by 0 days.

(21) Appl. No.: 17/379,191

(22) Filed: Jul. 19, 2021

(65) Prior Publication Data
US 2023/0016930 A1    Jan. 19, 2023

(51) Int. Cl.
H02M 3/156 (2006.01)
H02M 3/155 (2006.01)
H02M 1/00 (2006.01)
H02H 9/02 (2006.01)

(52) U.S. Cl.
CPC ............. H02M 3/155 (2013.01); H02H 9/02 (2013.01); H02M 1/0048 (2021.05)

(58) Field of Classification Search
None
See application file for complete search history.

(56) References Cited

U.S. PATENT DOCUMENTS

| | | | |
|---|---|---|---|
| 6,943,535 B1* | 9/2005 | Schiff | H02M 3/1584 323/244 |
| 7,007,176 B2* | 2/2006 | Goodfellow | H02M 3/1584 323/283 |
| 7,259,473 B2* | 8/2007 | Petricek | H02J 1/10 323/272 |
| 9,716,433 B2* | 7/2017 | Coleman | H02J 1/10 |
| 9,973,084 B2* | 5/2018 | Tang | G01R 21/133 |
| 10,044,255 B2* | 8/2018 | Sreenivas | H02M 3/1584 |
| 10,693,361 B2* | 6/2020 | Guo | G01R 31/2836 |

OTHER PUBLICATIONS

Das, et al., "A Bidirectional Wide Load Range Multiphase Buck/Boost Converter for Differential Power Processing", 2017, IEEE, pp. 1-7, Authorized licensed use limited to: Infineon Technologies AG. Downloaded on Jun. 16, 2021 at 20:03:23 UTC from IEEE Xplore.

* cited by examiner

*Primary Examiner* — Jeffery S Zweizig
(74) *Attorney, Agent, or Firm* — Armis IP Law, LLC

(57) ABSTRACT

An apparatus includes a controller. The controller monitors a magnitude of first current supplied by an output voltage of a first power converter to power a dynamic load. The controller controls a second power converter to supply second current through the dynamic load based on the monitored magnitude of first current.

34 Claims, 13 Drawing Sheets

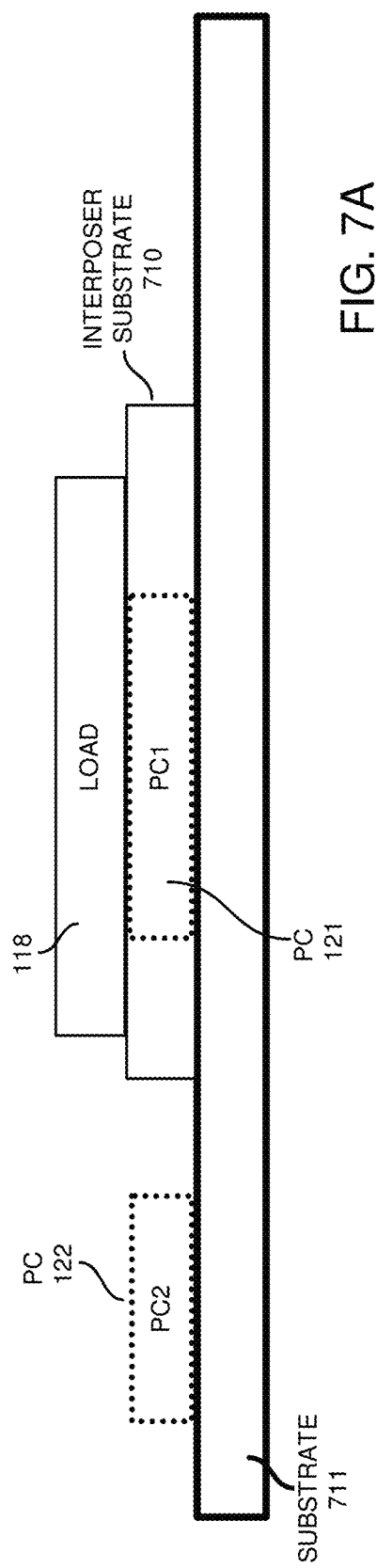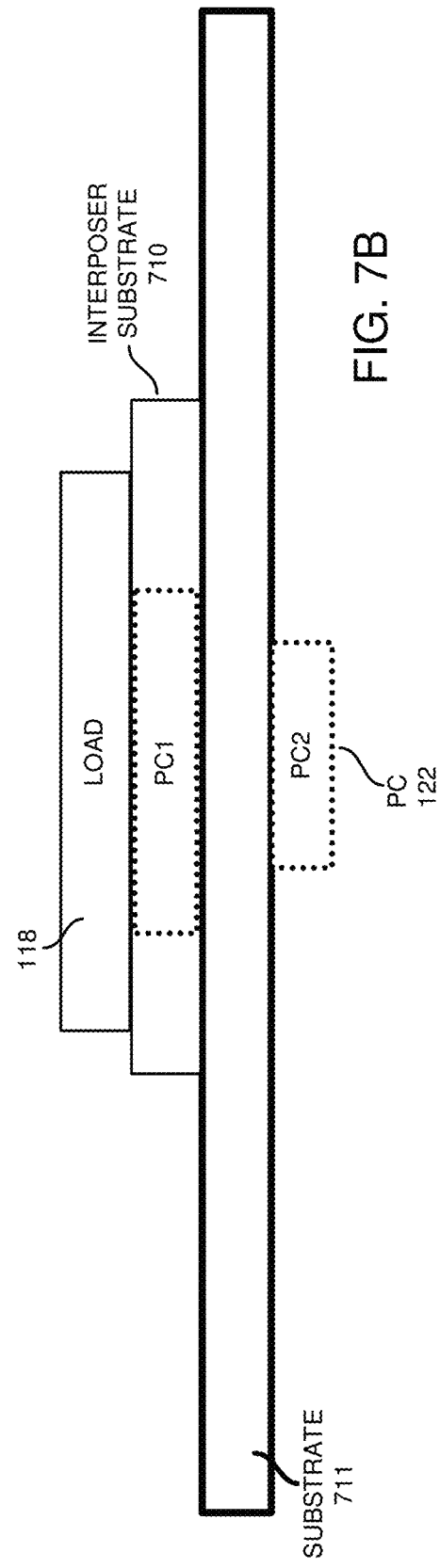

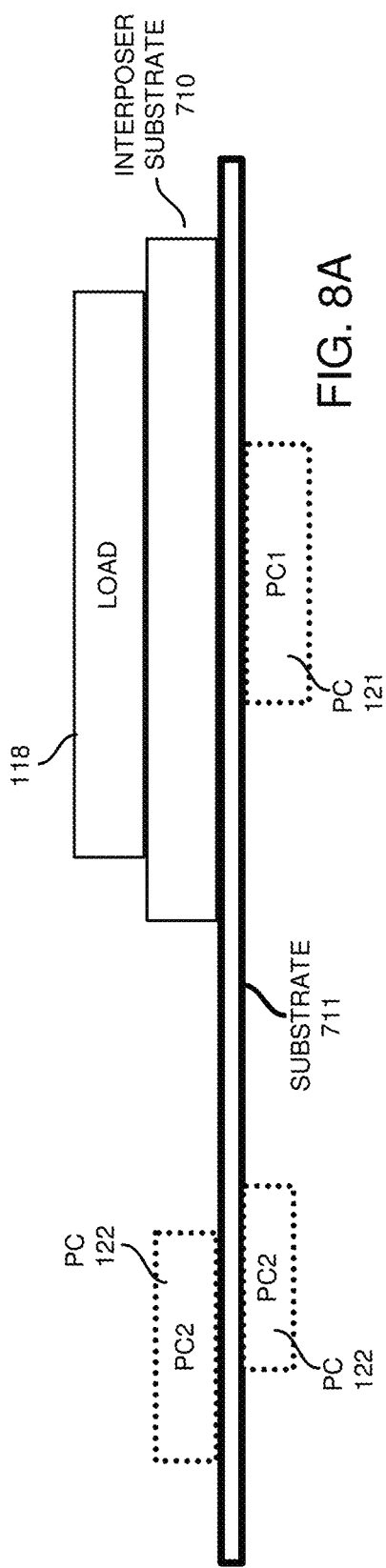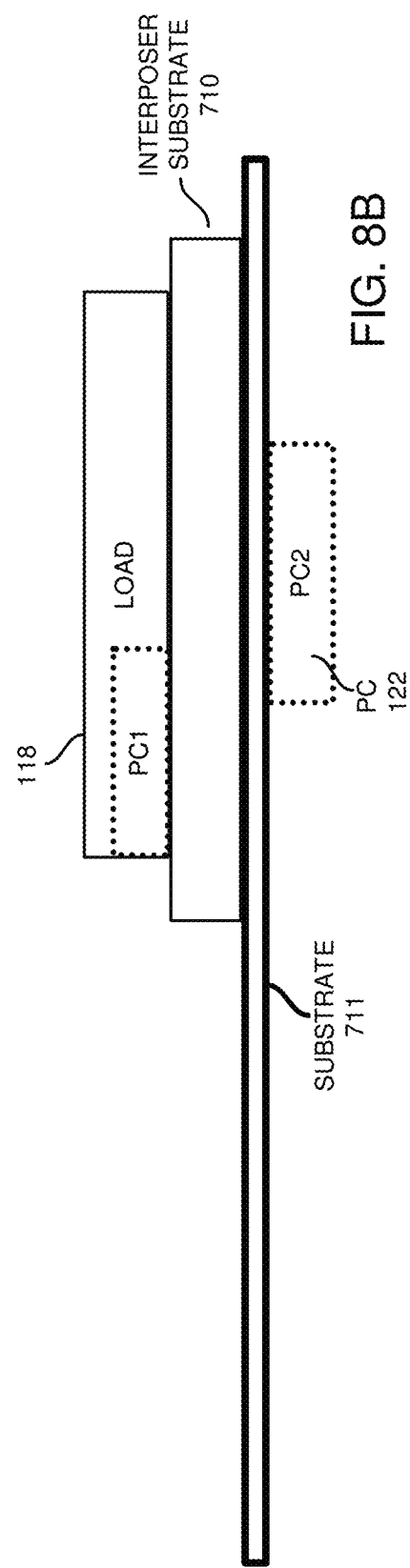

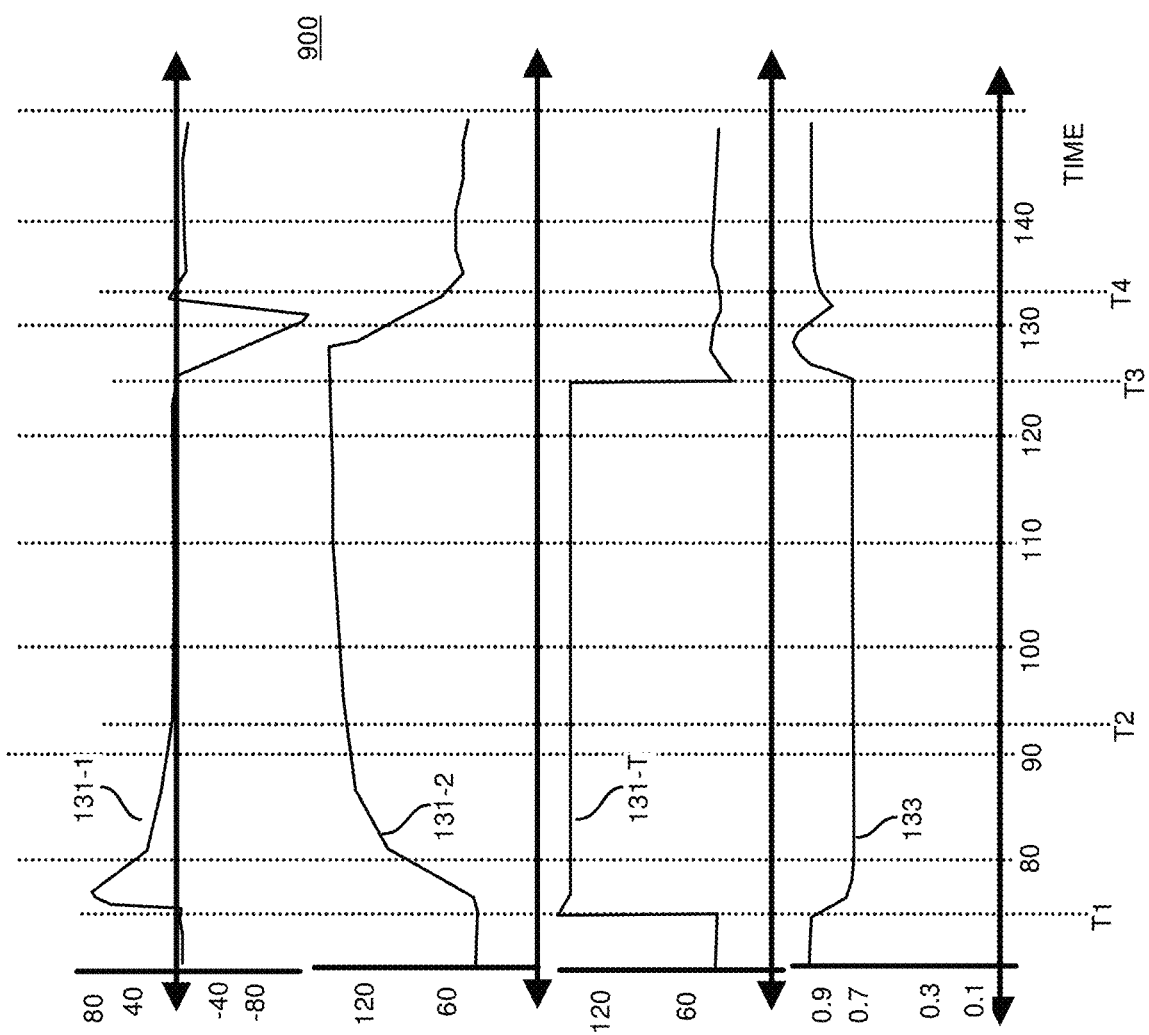

POWER SUPPLY SYSTEM AND CONTROL IN A DYNAMIC LOAD CONFIGURATION

BACKGROUND

One type of conventional power converter is a buck converter. In general, to maintain an output voltage within a desired range, a controller in the buck converter compares the magnitude of a generated output voltage to a setpoint reference voltage. Based on a respective error voltage, the controller modifies a respective switching frequency and/or pulse width modulation associated with activating high side switch circuitry and low side switch circuitry in the buck converter to maintain a magnitude of the output voltage.

In certain instances, the controller controls operation of the buck converter and generation of the output voltage based on an amount of output current supplied by a generated output voltage to a load. For example, conventional techniques include receiving a so-called VID (Voltage Identification) from a load such as a processor being powered by the output voltage. The VID indicates a setpoint voltage in which to produce the output voltage to power the load. The magnitude of the VID setting (reference voltage) may vary depending on a magnitude of the output current. In a manner as previously discussed, the controller of the power supply regulates a magnitude of the output voltage supplied to the load based on a target setpoint voltage derived from the received VID value.

BRIEF DESCRIPTION

Implementation of clean energy (or green technology) is very important to reduce our impact as humans on the environment. In general, clean energy includes any evolving methods and materials to reduce an overall toxicity of energy consumption on the environment.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, etc. Regardless of whether energy is received from green energy sources or non-green energy sources, it is desirable to make most efficient use of raw energy provided by such systems to reduce our impact on the environment. This disclosure contributes to reducing our carbon footprint (and green energy) via more efficient energy conversion.

This disclosure further includes the observation that an important aspect of designing a power system is to consider heat generated by different components.

Embodiments herein include novel ways of implementing control of one or more power converters to jointly power a load. Among other benefits, certain embodiments as discussed herein provide a way to manage heat dissipation in the power system while still providing efficient regulation of power to a dynamic load.

More specifically, embodiments herein include an apparatus and/or system including a controller. The controller monitors a magnitude of first current supplied by an output voltage of a first power converter to power a dynamic load. Based on the monitored magnitude of first current supplied by the first power converter to power the dynamic load, the controller controls a second power converter to supply second current through the dynamic load. In one embodiment, at least at times, the generation of the second output current alleviates the first power converter from having to power the dynamic load.

In further example embodiments, the first power converter regulates the output voltage with respect to a desired reference voltage. Via the second power converter, the controller uses the monitored magnitude of the first current to control a magnitude of the second current supplied from the second power converter. Generation of the second current reduces a burden on the first power converter to supply the appropriate current to the dynamic load to maintain the output voltage with respect to a desired reference voltage. The reduced burden decreases an amount of heat dissipated by the first power converter.

In still further example embodiments, the controller compares the magnitude of the first current to a target current reference value and controls operation of the second power converter and generation of the second current based on results of the comparing. Further embodiments herein include, via the controller, adjusting a magnitude of the second current such that a difference between the magnitude of the first current supplied from the first power converter and the target current reference value is biased toward zero. In other words, in certain embodiments, the second power converter produces the second current to power the load to reduce an amount of the first current supplied by the first power converter to the load.

In yet further example embodiments, the controller implements a clamp function in a control loop. Via the clamp function in the control loop associated with the second power converter, the controller limits a magnitude of the second current supplied from the second power converter to the load.

Note that the different control loops as discussed herein can be implemented in any suitable manner. For example, in one embodiment, the controller as discussed herein implements a control loop of the second power converter to operate in a current control mode to produce the second current. Alternatively, the controller implements a control loop of the second power converter to operate in a voltage control mode to produce the second current.

As previously discussed, one benefit of the dual voltage-current regulation as discussed herein enables flexible control of dissipating heat at different locations. For example, the first power converter and the second power converter can be disposed at different distances with respect to the dynamic load. More specifically, in one embodiment, the first power converter is disposed closer to the load than the second power converter.

In yet further example embodiments, the first power converter is disposed in a stacked configuration with respect to the load.

In still further example embodiments, the first power converter and the second power converter share a duty of supplying power to the dynamic load under different conditions. For example, in one embodiment, a ratio of first power supplied by the first power converter to the load via the first current is substantially greater than second power supplied by the second power converter to the load via the second current during transient load conditions. Alternatively, the ratio of the first power supplied by first power converter to the load via the first current is substantially less than the second power supplied by the second power converter to the load via the second current during non-transient load conditions.

Still further example embodiments herein include, via the controller, varying a number of phases activated in the first power converter and the second power converter depending on a magnitude of power consumption by the load.

Embodiments herein are useful over conventional techniques. For example, the second power converter as discussed herein supplies current to the dynamic load, reducing a need for the first power converter to supply the current.

These and other more specific embodiments are disclosed in more detail below.

Note that although embodiments as discussed herein are applicable to power converters, the concepts disclosed herein may be advantageously applied to any other suitable topologies as well as general power supply control applications.

Note that any of the resources as discussed herein can include one or more computerized devices, controller, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to methods, systems, computer program products, etc., that support operations as discussed herein.

One embodiment herein includes a computer readable storage medium and/or system having instructions stored thereon. The instructions, when executed by computer processor hardware, cause the computer processor hardware (such as one or more co-located or disparately located processor devices) to: monitor a magnitude of first current supplied by a first power converter to power a dynamic load, an output voltage of the first power converter supplying the first current to power the dynamic load; and control a second power converter to supply second current through the dynamic load based on the monitored magnitude of first current supplied by the first power converter to power the dynamic load.

The ordering of the steps above has been added for clarity sake. Note that any of the processing operations as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of implementing one or more power converters to deliver current to a load. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

BRIEF DESCRIPTION OF THE DRAWINGS

FIG. 7A is an example diagram illustrating assembly of multiple power converters in an interposer layer according to embodiments herein.

FIG. 7B is an example diagram illustrating assembly of multiple power converters in an interposer layer according to embodiments herein.

FIG. 8A is an example diagram illustrating assembly of multiple power converters on a substrate according to embodiments herein.

FIG. 8B is an example diagram illustrating assembly of multiple power converters in an interposer layer according to embodiments herein.

FIG. 9 is an example timing diagram illustrating shared generation of output current to power a dynamic load via one or more thruster power converter phases and one or more payload power converter phases according to embodiments herein.

Figure 1:
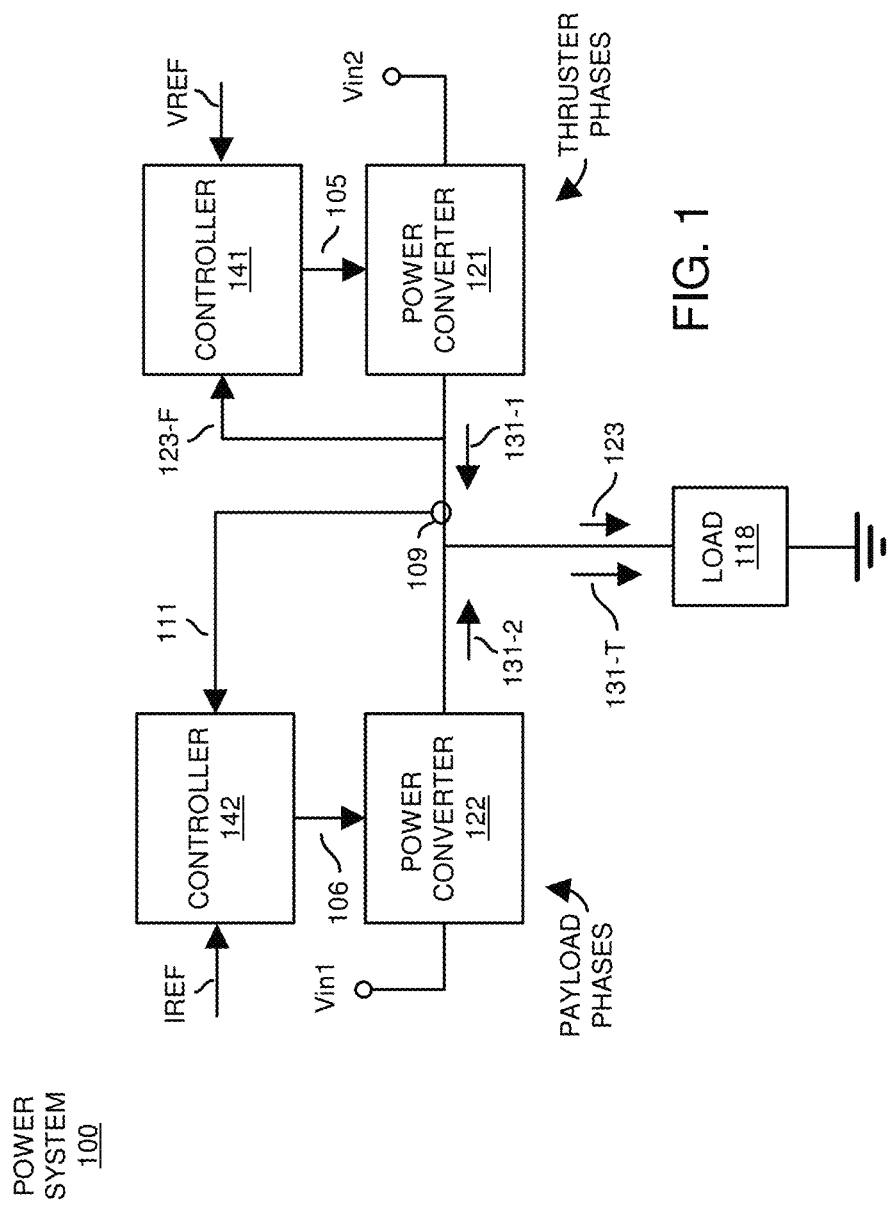
FIG. 1 is an example general diagram of a power supply including a primary power converter (such as multiple so-called payload power converter phases) and a secondary power converter (such as multiple so-called thruster power converter phases) according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Embodiments herein include a controller disposed in a power supply. The controller monitors a magnitude of first current supplied by an output voltage of a first power converter to power a dynamic load. The controller controls a second power converter to supply second current through the dynamic load based on the monitored magnitude of first current. In one embodiment, the controller controls the second power converter to reduce an amount of current supplied by the first power converter to the load such as during non-transient current consumption conditions. The first power converter maintains regulation of the output voltage with respect to a desired setpoint voltage.

Now, more specifically, FIG. 1 is an example general diagram of a power supply including a primary power converter (such as multiple thruster power converter phases) and a secondary power converter (such as multiple payload power converter phases) according to embodiments herein.

As shown, power system 100 includes controller 141, controller 142, power converter 121, and power converter 122.

Note that the resources in power supply 100 can be implemented in any suitable manner. For example, the resources in power supply 100 can be implemented as hardware, software, or a combination of hardware and software. In one embodiment, the controller 141 can be implemented as controller hardware, controller software, or a combination of controller hardware and controller software; controller 142 can be implemented as controller hardware, controller software, or a combination of controller hardware and controller software; and so on.

As further shown, power converter 121 receives input voltage Vin2; power converter 122 receives input voltage Vin1. The power converters can be configured to receive the input voltages from the same or different sources.

The magnitude of the input voltages Vin1 and Vin2 can be any suitable values. For example, a common voltage source (such as battery, wall power, etc.) can be configured to provide input voltages Vin1 and Vin2 in which a magnitude of the input voltage Vin1 equals a magnitude of the input voltage Vin2. Alternatively, the input voltages are supplied by different sources. In one embodiment, the magnitude of the input voltage Vin1 is different than a magnitude of the input voltage Vin2.

In one nonlimiting example embodiment, the input voltage Vin1 is 12 VDC; in another example embodiment, the input voltage Vin1 is 6-12 VDC derived from an open-loop step-down of 48V; Vin1 could be 12V or 6-12V derived from an open-loop step-down of 48V; Vin2 could be a lower voltage 1.5V-6V derived from Vin1; and so on.

In further example embodiments, the output voltage is a DC voltage.

In yet further example embodiments, the input voltage Vin1 is 48V (nominal) and the power converter 122 provides direct conversion to an appropriate voltage required by the dynamic load 118.

Additional embodiments herein include generating one or more of the input voltages via half-bridge converters. Other configurations include any transformer-based topology, including resonant converters, can be used with any rectifier structure.

In one embodiment, the input voltage Vin2 is 6-12V derived from open-loop or closed-loop step-down of 48V. Such an architecture saves a conversion stage for major power processing to reduce conduction loss and stress on the 48V/8V converter In general, during operation, the controller 141 provides voltage regulation with respect to producing the output voltage 123 to power the dynamic load 118. For example, the controller 141 receives the setpoint reference voltage VREF. Note that the magnitude of the setpoint reference voltage VREF may vary depending on operating conditions.

The power converter 121 further receives output voltage feedback signal 123-F (such as the output voltage 123 itself or a resistor divided voltage value) and compares it to the reference setpoint voltage VREF. The controller 141 produces the control signals 105 supplied to the power converter 121 such that output voltage 123 produced by the power converter 121 is substantially equal to the setpoint reference voltage VREF. Via the output voltage 123, the power converter 121 supplies output current 131-1 to the load 118.

As further shown, the controller 142 monitors a magnitude of the output current 131-1 supplied by the output voltage 123 of the power converter 121 to power the dynamic load 118. In one embodiment, the feedback 111 from monitor 109 indicates the magnitude of the output current 131-1.

The magnitude of the output current 131-1 can be determined in any suitable manner. For example, the magnitude of the output current 131-1 can be physically measured via the monitor 109. Monitor 109 communicates feedback 111 to the control 142.

Additionally, or alternatively, note that the magnitude of the output current 131-1 can be determined in whole or in part via emulation implemented by the controller or other suitable resource.

Based on the monitored magnitude of output current 131-1 supplied by the power converter 121 to power the dynamic load 118, the controller 142 controls the power converter 122 via control signals 106 to supply output current 131-2 to the dynamic load 118.

As previously discussed, in one embodiment, the power converter 121 regulates the output voltage 123 with respect to a desired setpoint reference voltage VREF. Via the power converter 122, the controller 142 uses the monitored magnitude of the output current 131-1 as indicated by feedback signal 111 to control a magnitude of the output current 131-2 supplied from the power converter 122 to the dynamic load 118.

In one embodiment, as further discussed herein, generation of the output current 131-2 from the power converter 122 reduces a need for the power converter 121 to supply power (via output current 131-2) to the dynamic load 118 to maintain the output voltage 123 with respect to the desired reference setpoint voltage VREF.

In still further example embodiments, the controller 142 compares the magnitude of the output current 131-1 as indicated by the feedback signal 111 to a target reference current value IREF (such as zero or other suitable value) and controls operation of the power converter 122 and generation of the output current 131-2 based on results of the comparing. For example, as further discussed herein, via control of power converter 122, the controller 142 produces the output current 131-2 and adjusts a magnitude of the output current 131-2 such that a difference between the magnitude of the output current 131-1 (supplied from the power converter 121) and the target current reference value IREF is zero. In other words, the controller 142 at least attempts to bias the magnitude of the output current 131-1 to be around zero when IREF=0. In such an instance, the controller 142 controls the power converter 122 to supply the appropriate output current 131-2 to the dynamic load 118 to maintain the output voltage 123 instead of the power converter 121 having to supply the power (via output current 131-1) to the dynamic load 118.

At times, the power converters 121 and 122 supply different amounts of output current to the dynamic load 118. The total output current 131-T supplied to the load 118 equals the output current 131-1+output current 131-2.

In one embodiment, the power converter 121 (such as implementing Transient phases referred to as "Thruster" phases) uses a standard control loop using voltage feedback from sense point to provide power to the dynamic load during transient conditions while the power converter 122 provides power to the dynamic load 118 during steady state conditions and transient conditions. The controller 141 and corresponding circuit can be implemented via any suitable control method: voltage mode, peak current mode, average current mode, constant on-time, hysteretic, etc.

Thus, the power converter 122 includes power processing phases referred to as "Payload" power converter phase and uses the detected magnitude of the Thruster current (such as output current 131-1) as a feedback signal to provide control of generating the output current 131-2. As previously discussed, in one embodiment, the so-called Payload control loop (such as monitoring a magnitude of the output current 131-1 (via feedback 111) and producing output current 131-2 implemented by the controller 142 drives the output current 131-1 (such as Thruster phase current) to setpoint reference current such as IREF (such as zero or other suitable value).

Figure 2:
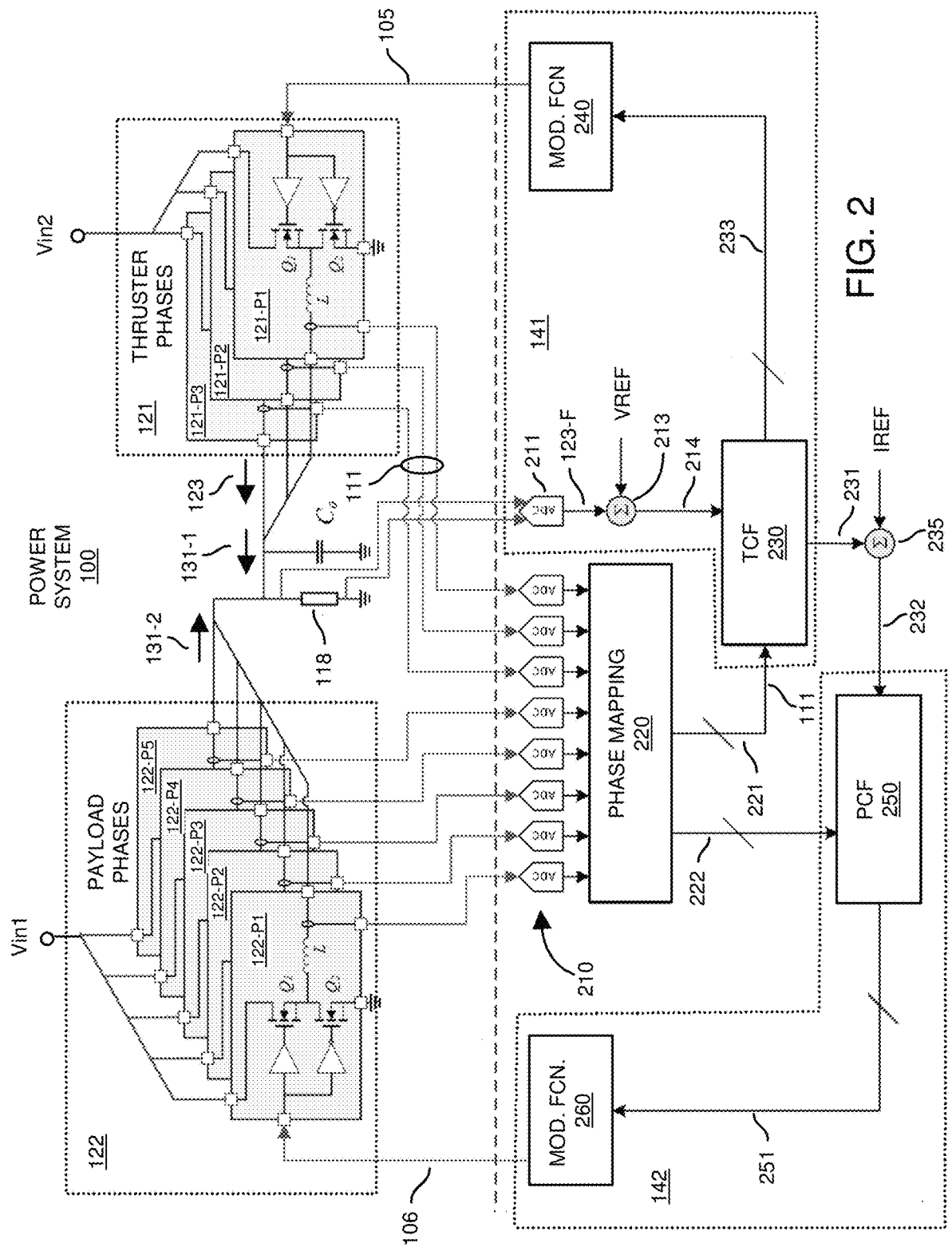
FIG. 2 is an example diagram illustrating implementation of multiple power converter phases (payload phases and thruster phases) to provide power to a dynamic load according to embodiments herein.

FIG. 2 is an example diagram illustrating implementation of multiple power converter phases (payload phases and thruster phases) to provide power to a dynamic load according to embodiments herein.

In one nonlimiting example embodiment, thruster controller 141 and payload controller 142 are implemented on the same piece of silicon (such as a single semiconductor chip), such as including or not including phase mapping 220.

In this example embodiment, the controller 141 includes thruster control function 230 and modulation function 240. The controller 142 includes payload control function 250 and modulation function 260.

Note that, further example embodiments herein include, via the controller 141, varying a number of phases that are activated in the power converter 121 and, via controller 142, varying a number of the phases in the second power converter 122 that are activated depending on a magnitude of power consumption by the load 118.

In one embodiment, the power converter 121 is a multi-phase power converter including power converter phase 121-P1, power converter phase 121-P2, power converter phase 121-P3, and so on. In one nonlimiting example embodiment, the power converter phases are via buck converter phases, although the power converter 121 can be implemented via any suitable technology.

As further shown, in one embodiment, the power converter 122 is a multi-phase power converter including power converter phase 122-P1, power converter phase 122-P2, power converter phase 122-P3, power converter phase 122-P4, power converter phase 122-P5, and so on. In one nonlimiting example embodiment, the power converter phases are via buck converter phases, although the power converter 122 can be implemented via any suitable technology.

Controller 141 can be configured to control any number of the power converter phases in the power converter 121 to produce the output current 131-1. Controller 142 can be configured to control any number of the power converter phases in power converter 122 to produce the output current 131-2.

Note further that power system 100 includes capacitance, Co, coupled to power converter 121 and power converter 122 to store the output voltage 123. Capacitance Co includes one or more capacitors.

As further shown, power system 100 includes current monitors 210 (such as including analog-to-digital converters), voltage monitor 211 (such as including an analog-to-digital converter), modulators 240, modulators 260, phase mapping 220, thruster control function 230, and payload control function 250.

As their names suggest, each of the monitors 210 monitors a respective current supplied by a respective phase to the dynamic load 118. Phase mapping 220 outputs detected output current information 221 (such as captured by signal 111) of each of the phases 121-P1, 121-P2, 121-P3, etc., to the thruster control function 230 associated with controller 141.

Phase mapping 220 outputs detected output current information 222 associated with each of the phases 122-P1, 122-P2, 122-P3, 122-P4, etc., to the payload control function 250 associated with controller 142.

As further shown, the monitor 211 of the controller 141 monitors the magnitude of the output voltage 123 (across the dynamic load 118) and produces output voltage feedback signal 123-F supplied to the summer 213. Output voltage feedback signal 123-F indicates a magnitude of the output voltage 123. Summer 213 produces an error voltage signal 214 based on a difference between the reference voltage VREF and the output voltage feedback signal 123-F.

Figure 4:
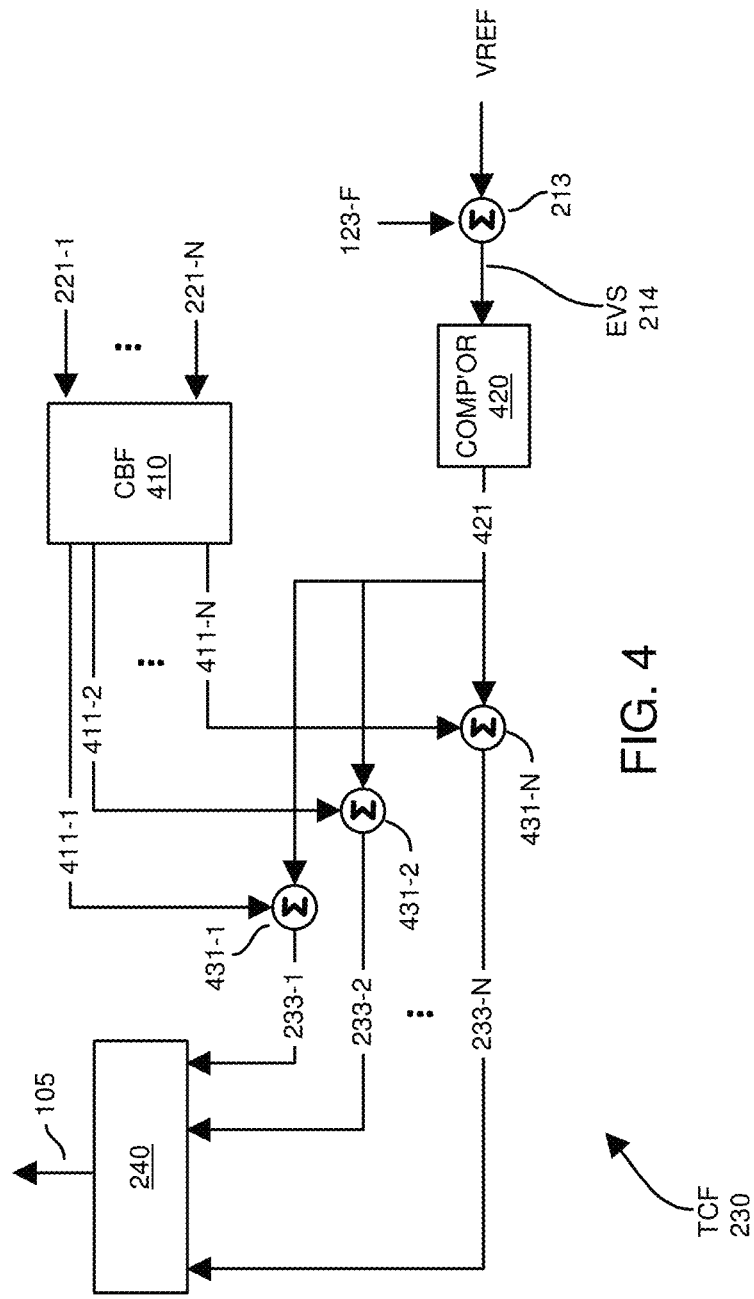
FIG. 4 is an example diagram illustrating a thruster control loop using voltage mode control according to embodiments herein.

Based on the error voltage signal 214 and monitored current supplied by each of the thruster power converter phases in power converter 121 as indicated by the output current information 221, as further shown in FIG. 4, the thruster control function 230 produces control signals 233 supplied to modulation function 240. Modulation function 240 uses the control signals 233 to generate control signals 105 that control operation of the power converter phases in power converter 121.

Referring again to FIG. 2, the thruster control function 230 outputs output current information 231 to the summer 235. In one embodiment, the output current information 231 indicates a magnitude of the total output current 131-1 supplied by the multiple power converter phases 121-P1, 121-P2, 121-P3, 121-P4, etc., to the dynamic load 118.

Figure 5:
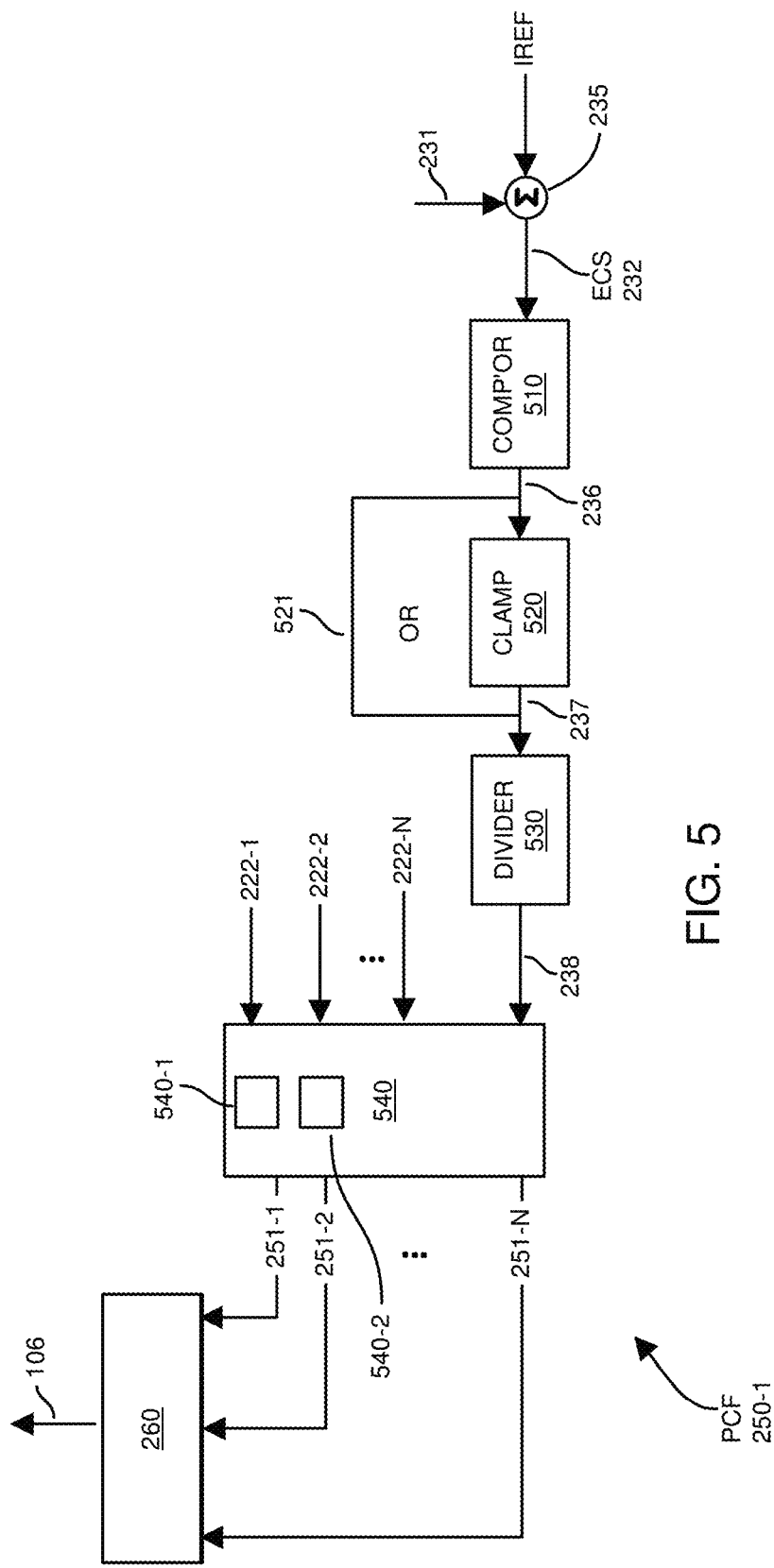
FIG. 5 is an example diagram illustrating a payload control loop using average current mode control according to embodiments herein.
Figure 6:
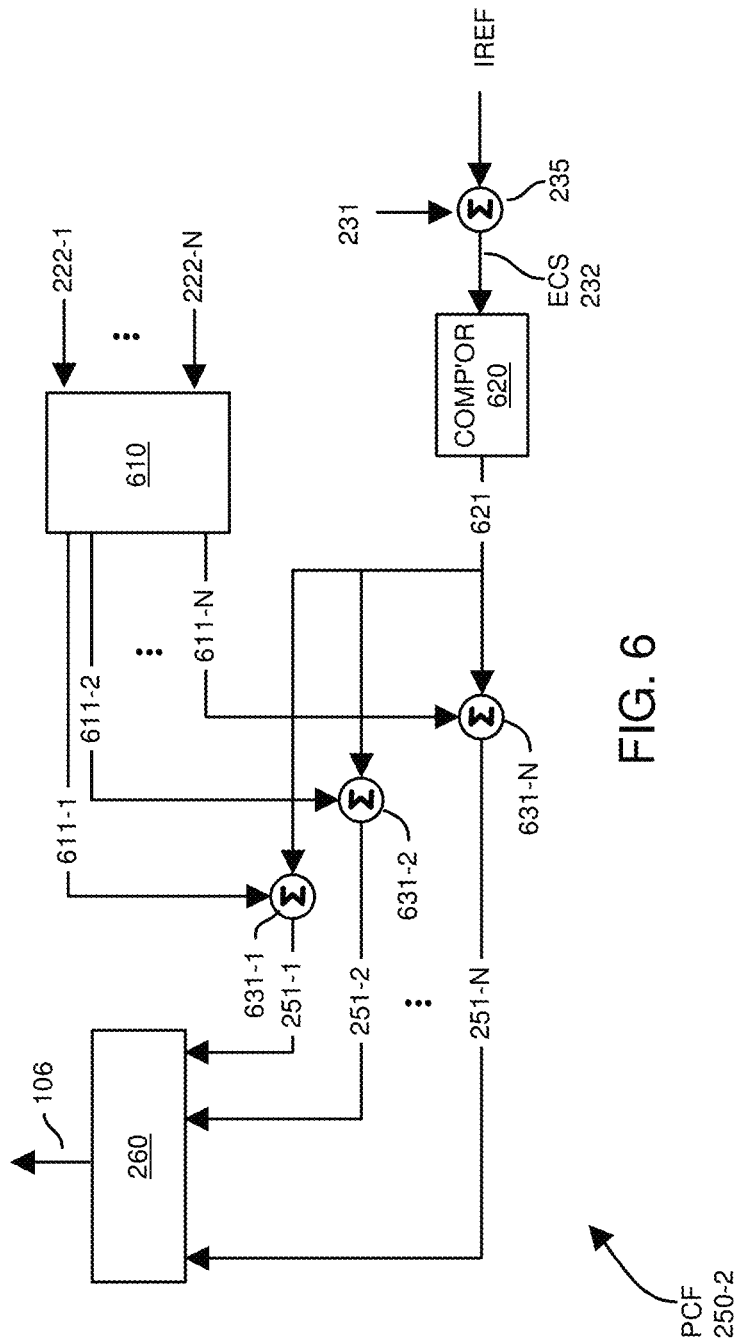
FIG. 6 is an example diagram illustrating a payload control loop using voltage mode control according to embodiments herein.

Summer 235 produces error current signal 232 based on a difference between the current reference IREF (such as zero or other suitable value) and the output current 131-1 as indicated by the output current information 231. As shown in FIG. 5 and FIG. 6, the payload control function 250 uses the error current signal 232 and the output current information 222 to generate control signals 251 and control operation of the power converter phases of the power converter 122.

Referring again to FIG. 2, in one embodiment, the power converter 121 is disposed near the dynamic load 118, providing fast transient response to providing current to the dynamic load 118 when needed. Such an embodiment reduces an amount of output capacitance, Co, and corresponding board space needed for capacitor Co to store the output voltage 123.

In further example embodiments, the zero average current control implementation combined with autonomous power state optimization of the power converter 121 (Thruster) removes frequency limitation of Thruster with minimal thermal penalty. Certain embodiments herein include implementing higher frequency operation. For example, transient performance and inductor volume reduction can be realized when Thruster switching frequency is greater than Payload switching frequency by at least 25%

Figure 3:
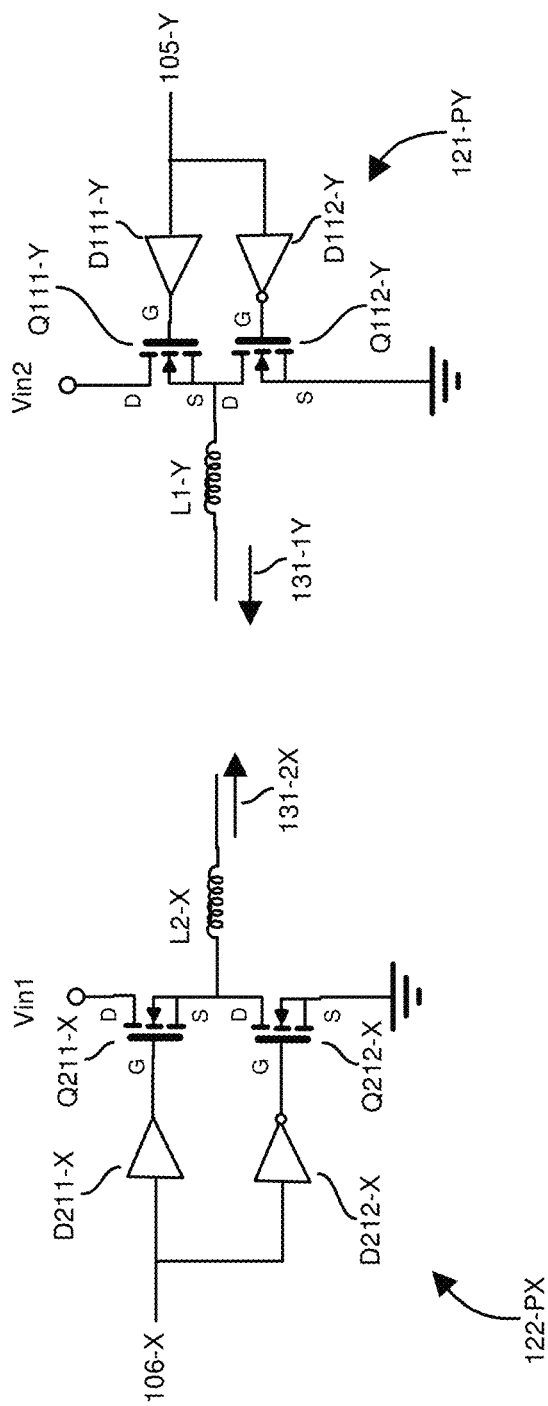
FIG. 3 is an example diagram illustrating details of a payload power converter phase and a thruster power converter phase according to embodiments herein.

FIG. 3 is an example diagram illustrating a payload power converter phase and a thruster power converter phase according to embodiments herein.

In this example embodiment, each of the power converter phases in the power converter 121-PY (where Y is an integer value indicating a phase) includes an inductor L1-Y, switch Q111-Y, switch Q112-Y, driver D111-Y, and driver D112-Y. Note that any of the switches as discussed herein can be implemented in any suitable manner such as via MOSFETs, semiconductor material including GaN and SiC; and any power semiconductor including BJT, IGBT, JFET, etc.

The switch Q111-Y and switch Q112-Y are connected in series between the input voltage Vin2 and a ground reference. For example, the drain (D) of switch Q111-Y is connected to receive the input voltage Vin2; the source (S) of switch Q111-Y is connected to the drain (D) of switch Q112-Y; the source (S) of switch Q112-Y is connected to the ground reference. Inductor L1-Y is connected to the source node of switch Q111-Y and drain node of switch Q112-Y.

Via the control signal 105-Y produced by the controller 141, the controller 141 controls operation of the switches Q111-Y and Q112-Y in the respective power converter phase 121-PY. For example, activation of the high-side switch Q111-Y while the low-side switch Q112-Y is deactivated causes a magnitude of the current 131-Y1 to increase during a respective control cycle; deactivation of the high-side switch Q111-Y while the low-side switch Q112-Y is activated causes a magnitude of the current 131-Y1 to decrease during a respective control cycle. As discussed herein, the controller 141 varies the duty cycle of generating the control signal 105-Y to control a magnitude of the output current 131-1Y supplied from the inductor L1-Y to the dynamic load 118.

In this example embodiment, each of the power converter phases 122-PX in the power converter 122 (where X is an integer value indicating a phase) includes an inductor L2-X, switch Q211-X, switch Q212-X, driver D211-X, and driver D212-X. Note that any of the switches as discussed herein can be implemented in any suitable manner such as via MOSFETs, semiconductor material including GaN and SiC; and any power semiconductor including BJT, IGBT, JFET, etc.

The switch Q211-X and switch Q212-X are connected in series between the input voltage Vin1 and a ground reference. For example, the drain (D) of switch Q211-X is connected to receive the input voltage Vin1; the source (S) of switch Q211-X is connected to the drain (D) of switch Q212-X; the source (S) of switch Q212-X is connected to the ground reference. Inductor L2-X is connected to the source node of switch Q211-X and drain node of switch Q212-X.

Via the control signal 106-X produced by the controller 142, the controller 142 controls operation of the switches in the respective power converter phase 122-PX. For example, activation of the high-side switch Q211-X while the low-side switch Q212-X is deactivated causes a magnitude of the current 131-2X to increase during a respective control cycle; deactivation of the high-side switch Q211-X while the low-side switch Q212-X is activated causes a magnitude of the current 131-2X to decrease during a respective control cycle. As discussed herein, the controller 142 varies the duty cycle of generating the control signal 106-X to control a magnitude of the output current 131-2X supplied to the dynamic load 118.

FIG. 4 is an example diagram illustrating a thruster control loop using voltage mode control according to embodiments herein.

In this example embodiment, as previously discussed, the summer 213 produces the error voltage signal 214 as a difference between the reference voltage VREF and the output voltage feedback signal 123-F (e.g., VREF—a magnitude of the output voltage 123). The summer 213 outputs the error voltage signal 214 to the compensator 420.

In this embodiment, the compensator 420 (such as a PID compensator including a summation of Proportional-Integral-Derivative terms applied to the error voltage signal 214) receives the error voltage signal 214 and produces duty cycle control signal 421 supplied to each of the summers 431 (431-1, 431-2, etc.).

As its name suggests, the current balance function 410 balances current supplied by the thruster phases in the power converter 121. The current balance function 410 receives respective output current information 221 associated with the power converter phases 121-P and produces respective duty cycle control information 411 associated with each of the power converter phases 121-P. For example, the current balance function 410 produces signal 411-1 associated with the power converter phase 121-P1; the current balance function 410 produces signal 411-2 associated with the power converter phase 121-P2; and so on.

Additionally, as further shown, the summer 431-1 sums the signal 411-1 and duty cycle signal 421 to produce duty cycle control signal 233-1 provided to the modulator function 240; the modulator function 240 uses the duty cycle control signal 233-1 to produce control signal 105-1 used to control the high and low side switches in power converter phase 121-P1.

The summer 431-2 sums the signal 411-2 and duty cycle signal 421 to produce duty cycle control signal 233-2 provided to the modulator function 240; the modulator function 240 uses the duty cycle control signal 233-2 to produce control signal 105-2 used to control the high and low side switches in power converter phase 121-P2.

The summer 431-N sums the signal 411-N and duty cycle signal 421 to produce duty cycle control signal 233-N provided to the modulator function 240; the modulator function 240 uses the duty cycle control signal 233-N to produce control signal 105-N used to control the power converter phase 121-PN.

In a manner as previously discussed, generation of the control signals 105 maintains a magnitude of the output voltage 123 with respect to the setpoint reference voltage VREF.

FIG. 5 is an example diagram illustrating a payload control loop using average current mode control according to embodiments herein.

In this example embodiment, the summer 235 of payload control function 250-1 (first possible instance of payload control function 250) produces the error current signal 232 based on a difference between the summation of the thruster current (output current 131-1 as indicated by signal 111) and current reference signal IREF (such as zero amperes or other suitable value).

As previously discussed, the controller 142 controls the power converter 122 and corresponding phases to reduce an amount of output current 131-1 supplied by the power converter 121 to the dynamic load 118.

In this embodiment, the compensator 510 (such as a PID compensator) receives the error current signal 232 and produces control signal 236 (such as including a summation of Proportional-Integral-Derivative terms applied to the error current signal 232) supplied to clamp function 520.

Clamp function 520 is optional. As an alternative to the clamp function, the control signal 236 can be outputted directly to the divider 530 via path 521.

As its name suggests, when implemented, the clamp function 520 (optional) limits a magnitude of the output current 131-2 supplied by the power converter 122 to the dynamic load 118. In such an instance, because the power converter 122 is limited as to how much power it can supply to the dynamic load 118, the power converter 121 supplies a portion of the power to the dynamic load 118 during non-transient conditions. The clamp setting associated with the clamp function 520 can be set to any threshold level.

As further shown, clamp function 520 outputs corresponding (clamped) control signal 237 to the divider function 530. As its name suggests, the divider function 530 divides the magnitude of the control signal 237 by a number of power converter phases in the power converter 122 that are activated to produce the output current 131-2. Based on control signal 238 (control signal 237 or control signal 236 divided by the number of activated payload phases), the divider function 530 produces the control signal 238. Each of the activated power converter phases of the power converter 122 supplies a portion of the output current 131-2 required to power the dynamic load 118.

The control function 540 compares the current supplied by each of the power converter phases in the power converter 122 to a respective desired control setting as indicated by the control signal 238. The control function 540 produces control signals 251 in accordance with the control signal 238 and the actual current (222-1, 222-2, 222-3, etc.) supplied to the dynamic load 118. For example, the control function 540-1 (such as a PID controller function) uses the control signal 238 and output current of power converter phase 122-P1 to produce duty cycle control signal 251-1 to control the power converter phase 122-P1; . . . ; the control function 540-N (such as a PID controller function) uses the control signal 238 and output current of power converter phase 122-PN to produce duty cycle control signal 251-N to control the power converter phase 122-PN.

Generation and adjustment of the control signals 251 via the control function 540 and subsequent implementation of the modulation function 260 to produce the control signals 106 maintains the magnitude of the output currents of the power converter phases in the power converter 122, reducing a magnitude of the output current 131-1 required to maintain a magnitude of the output voltage at a desired reference voltage.

FIG. 6 is an example diagram illustrating a payload control loop using voltage mode control according to embodiments herein.

In this example embodiment, as previously discussed, the summer 235 produces the error current signal 232 as a difference between the reference current IREF and the output current 131-1.

In this embodiment, the compensator 620 (such as a PID compensator including a summation of Proportional-Integral-Derivative terms applied to the error current signal 232) receives the error current signal 232 and produces duty cycle signal 621 supplied to each of the summers 631 (631-1, 631-2, etc.).

As its name suggests, the current balance function 610 balances current supplied by the payload phases in the power converter 122. The current balance function 610 receives respective output current information 222 associated with each of the power converter phases 122-P and produces respective duty cycle control information 611 associated with each of the power converter phases 122-P. For example, the current balance function 610 produces signal 611-1 associated with the power converter phase 122-P1; the current balance function 610 produces signal 611-2 associated with the power converter phase 122-P2; and so on.

Additionally, as further shown, the summer 631-1 sums the signal 611-1 and duty cycle signal 621 to produce duty cycle control signal 251-1 provided to the modulator function 260; the modulator function 260 uses the duty cycle control signal 251-1 to produce control signal 106-1 used to control the power converter phase 122-P1.

The summer 631-2 sums the signal 611-2 and duty cycle signal 621 to produce duty cycle control signal 251-2 provided to the modulator function 260; the modulator function 260 uses the duty cycle control signal 251-2 to produce control signal 106-2 used to control the power converter phase 122-P2.

The summer 631-N sums the signal 611-N and duty cycle signal 621 to produce duty cycle control signal 251-N provided to the modulator function 260; the modulator function 260 uses the duty cycle control signal 251-N to produce control signal 106-N used to control the power converter phase 122-PN.

Generation and adjustment of the control signals 251 via the payload control function 250-2 and subsequent implementation of the modulation function 260 to produce the control signals 106 maintains the magnitude of the output currents of the power converter phases in the power converter 122, reducing a magnitude of the output current 131-1 required to maintain a magnitude of the output voltage 123 at a desired setting.

FIG. 7A is an example diagram illustrating assembly of multiple power converters in an interposer layer according to embodiments herein.

In this example embodiment, the first power converter 121 and the second power converter 122 are disposed at different distances with respect to the dynamic load 118. For example, in one embodiment, the first power converter 121 is disposed closer to the load 118 than the second power converter 122 as shown in FIG. 7.

More specifically, power system 100 includes a respective interposer substrate 710. The power converter 121 is disposed near dynamic load 118 such as beneath it. Power converter 122 is disposed on substrate 711 (such as a motherboard) at a distance away from the dynamic load 118 and power converter 121 disposed in interposer substrate 710. Such a configuration is desirable because, in one embodiment, the dynamic load dissipates substantial heat; the power converter 121 provides power during transient conditions resulting in dissipation of a lesser amount of heat with respect to the heat generated by the power converter 122. In other words, the power converter 122 supplies a majority of power to the dynamic load 118, resulting in relatively little heat generated by the power converter 121. Thus, because the heat generated by the power converter 121 is low, the substrate 710 is able to more easily dissipate the heat generated by the load 118.

FIG. 7B is an example diagram illustrating assembly of multiple power converters in an interposer layer according to embodiments herein.

In this example embodiment, the first power converter 121 is disposed in interposer substrate 710 between the load 118 and the substrate 711. The power converter 122 is disposed on a surface of the substrate 711 opposite the interposer substrate 710.

FIG. 8A is an example diagram illustrating assembly of multiple power converters on a substrate according to embodiments herein.

As previously discussed, the first power converter 121 and the second power converter 122 can be disposed (on one or more surfaces of the substrate 711) at different distances with respect to the dynamic load 118. For example, in one embodiment, the first power converter 121 is disposed closer to the load 118 than the second power converter 122.

Thus, components associated with the power converter 122 are disposed at a distance from the dynamic load 118. Power converter 122 and corresponding components are disposed further away from the dynamic load 118 than power converter 121. As previously discussed, such a configuration is desirable because, in one embodiment, the dynamic load dissipates substantial heat; the power converter 121 provides power during transient conditions resulting in dissipation of a small amount of heat with respect to the power converter 122, which provides a majority of power to the dynamic load 118.

In yet further example embodiments, as shown in FIG. 8A, the first power converter 121 is disposed in a stacked configuration with respect to the load 118.

FIG. 8B is an example diagram illustrating assembly of multiple power converters in an interposer layer according to embodiments herein.

In this example embodiment, the first power converter 121 is disposed in the dynamic load 118. The interposer substrate 710 resides between load 118 and the substrate 711. The power converter 122 is disposed on a surface of the substrate 711 opposite the interposer substrate 710.

FIG. 9 is an example timing diagram illustrating shared generation of output current to power a dynamic load via one or more thruster power converter phases and one or more payload power converter phases according to embodiments herein.

In still further example embodiments, in a manner as previously discussed, the first power converter 121 and the second power converter 122 share a duty of supplying power (via output current 131-1 and output current 131-2) to the dynamic load 118 under different conditions.

For example, in one embodiment, during transient load conditions, a ratio of the power supplied by the power converter 121 to the load 118 via the output current 131-1 is substantially greater than power supplied by the power converter 122 to the load 118 via the output current 131-2. Alternatively, the ratio of the power supplied by power converter 122 to the load 118 via the output current 131-2 is substantially greater than the power supplied by the power converter 121 to the load 118 via the output current 131-1 during non-transient load conditions.

Timing diagram 900 illustrates output current sharing between the power converters during transient and non-transient conditions.

For example, at or around time T1, the total current 131-T consumed by the dynamic load 118 steps up from around 40 amps to 125 amps. At such time, in response to the transient condition at time T1, the power converter 121 temporarily and immediately increases a magnitude of output current 131-1 supplied by the power converter phases of power converter 121 to accommodate the current consumption change. After spiking to a peak value, the magnitude of output current 131-1 supplied by the power converter 121 reduces between time T1 and time T2 as the power converter 122 increases a magnitude of current 131-2 supplied to the dynamic load 118 between time T1 and time T2.

As further shown, at or around time T3, the total current 131-T consumed by the dynamic load 118 steps down from around 125 amps to 40 amps. At such time, in response to the transient condition at or around time T3, the power converter 121 temporarily decreases (such as to a negative value) a magnitude of output current 131-1 supplied by the power converter phases of power converter 121 below zero amps to accommodate the current consumption change. The magnitude of output current 131-2 supplied by the power converter 122 decreases between time T3 and time T4 as the power converter 121 settles back to supplying zero current to the dynamic load 118 while the power converter 122 supplies the steady state current of around 40 amps after time T4.

Figure 10:
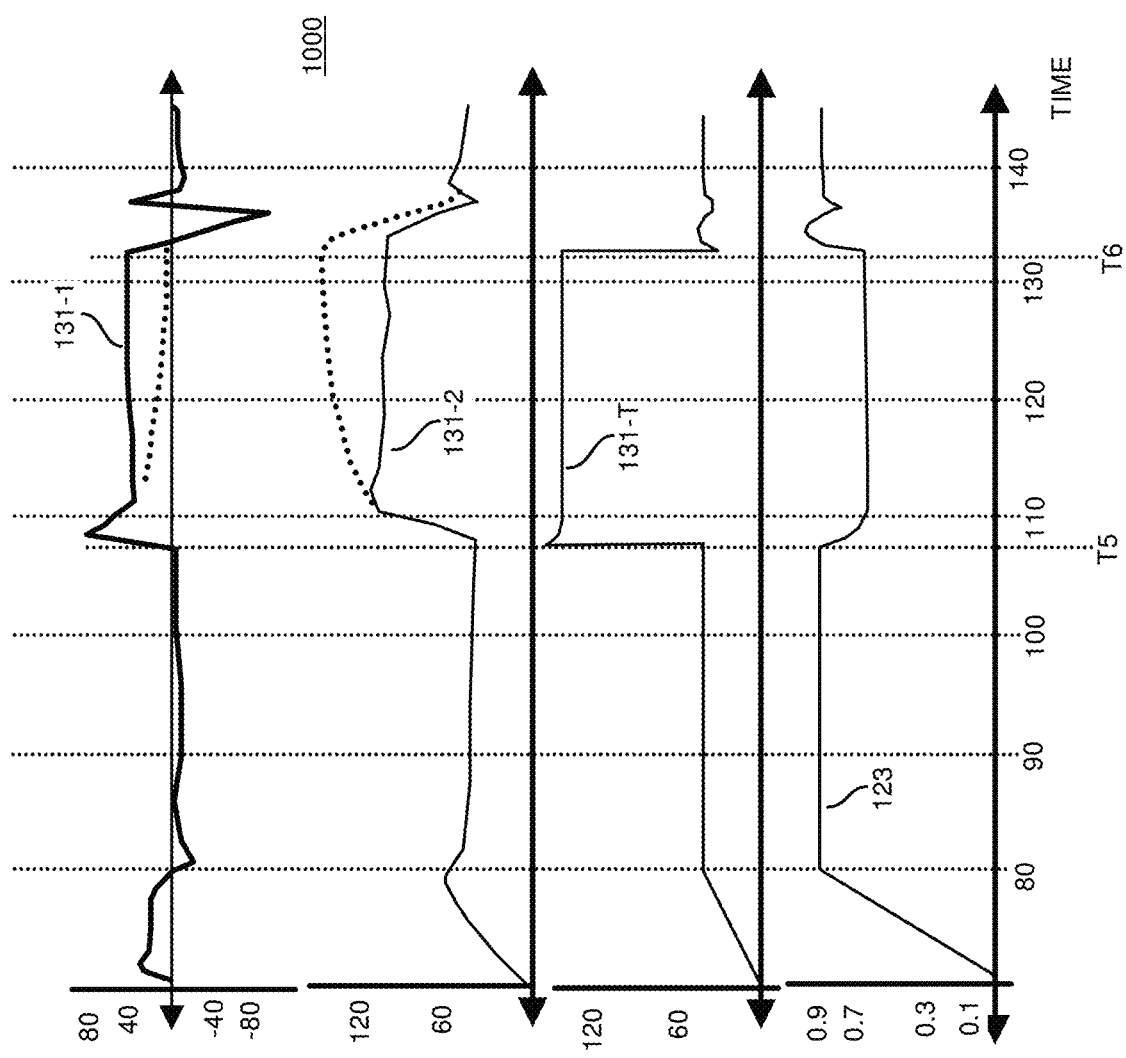
FIG. 10 is an example timing diagram illustrating current limit capabilities and shared generation of output current to power a dynamic load via one or more thruster power converter phases and one or more payload power converter phases according to embodiments herein.

FIG. 10 is an example timing diagram illustrating current limit capabilities and shared generation of output current to power a dynamic load via one or more thruster power converter phases and one or more payload power converter phases according to embodiments herein.

Timing diagram 1000 illustrates an example of output current sharing between the power converters during transient and non-transient conditions.

For example, at or around time T5, the total current 131-T consumed by the dynamic load 118 steps up from around 40 amps to 130 amps. In this example embodiment, the power converter power converter 121 continues to provide transient current to accommodate the transient change in current consumption by the load 118 in a manner as previously discussed. However, in accordance with the clamp function as previously discussed, the power converter 122 is limited as to how much output current is supplied to the dynamic load 118. In this instance, because the power converter 122 is limited as to a maximum amount of power or current to the dynamic load 118, the power converter 121 supplies a portion of the total steady state output current to power the dynamic load 118 between time T5 and T6, reducing how much output current is needed to be supplied by the power converter 122 to the dynamic load 118. The clamping of current provided by power converter 122 can be performed to reduce the size of power converter 122 or number of phases, while still maintaining safe operation. In one embodiment, power converter 121 (Thruster) provides so-called "turbo" or transient current demanded for high performance operation of dynamic load 118.

Figure 11:
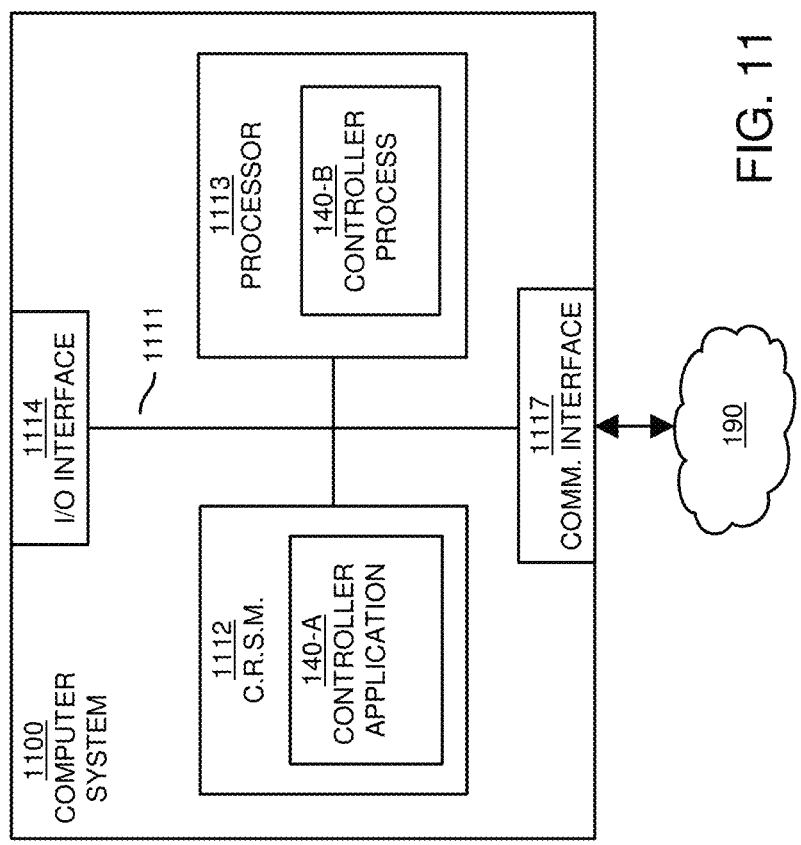
FIG. 11 is an example diagram illustrating computer processor hardware and related software instructions that execute methods according to embodiments herein.

FIG. 11 is an example block diagram of a computer device for implementing any of the operations as discussed herein according to embodiments herein.

As shown, computer system 1100 (such as implemented by any of one or more resources such as each of controller 141, control 142, etc.) of the present example includes an interconnect 1111 that couples computer readable storage media 1112 such as a non-transitory type of media (or hardware storage media) in which digital information can be stored and retrieved, a processor 1113 (e.g., computer processor hardware such as one or more processor devices), I/O interface 1114 (e.g., to output control signals to the power converter phases, monitor current, etc.), and a communications interface 1117.

I/O interface 1114 provides connectivity to any suitable circuitry such as power converter phases.

Computer readable storage medium 1112 can be any hardware storage resource or device such as memory, optical storage, hard drive, floppy disk, etc. In one embodiment, the computer readable storage medium 1112 stores instructions and/or data used by the controller application 140-A (such as implemented by any of controllers 141, 142, etc.) to perform any of the operations as described herein.

Further in this example embodiment, communications interface 1117 enables the computer system 1100 and processor 1113 to communicate over a resource such as network 190 to retrieve information from remote sources and communicate with other computers.

As shown, computer readable storage media 1112 is encoded with controller application 140-A (e.g., software, firmware, etc.) executed by processor 1113. Controller application 140-A can be configured to include instructions to implement any of the operations as discussed herein.

During operation of one embodiment, processor 1113 accesses computer readable storage media 1112 via the use of interconnect 1111 in order to launch, run, execute, interpret or otherwise perform the instructions in controller application 140-A stored on computer readable storage medium 1112.

Execution of the controller application 140-A produces processing functionality such as controller process 140-B in processor 1113. In other words, the controller process 140-B associated with processor 1113 represents one or more aspects of executing controller application 140-A within or upon the processor 1113 in the computer system 1100.

In accordance with different embodiments, note that computer system 1100 can be a micro-controller device, logic, hardware processor, hybrid analog/digital circuitry, etc., configured to control a power supply and perform any of the operations as described herein.

Functionality supported by the different resources will now be discussed via flowchart in FIG. 12. Note that the steps in the flowcharts below can be executed in any suitable order.

Figure 12:
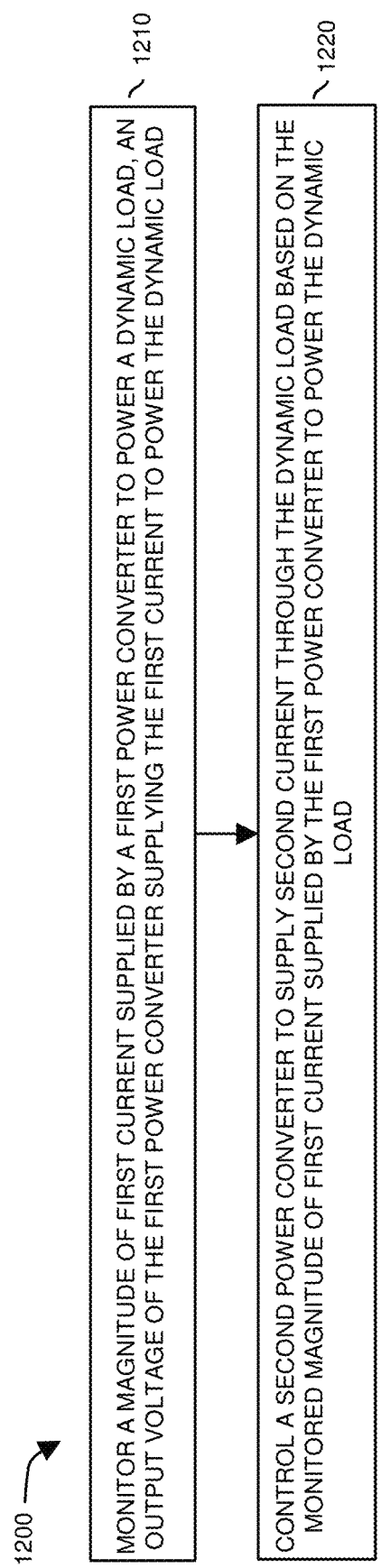
FIG. 12 is an example diagram illustrating a method according to embodiments herein.

FIG. 12 is an example diagram illustrating a method of controlling a power converter according to embodiments herein.

In processing operation 1210, the controller 140-2 monitors a magnitude of first current 131-1 supplied by the first power converter 121 to power the dynamic load 118. The output voltage 123 of the first power converter 121 supplies the first current 131-1 to power the dynamic load 118.

In processing operation 1220, the controller 140-2 controls the second power converter 122 to supply second current 131-2 through the dynamic load 118 based on the monitored magnitude of first current 131-1 supplied by the first power converter 121 to power the dynamic load 118.

Figure 13:
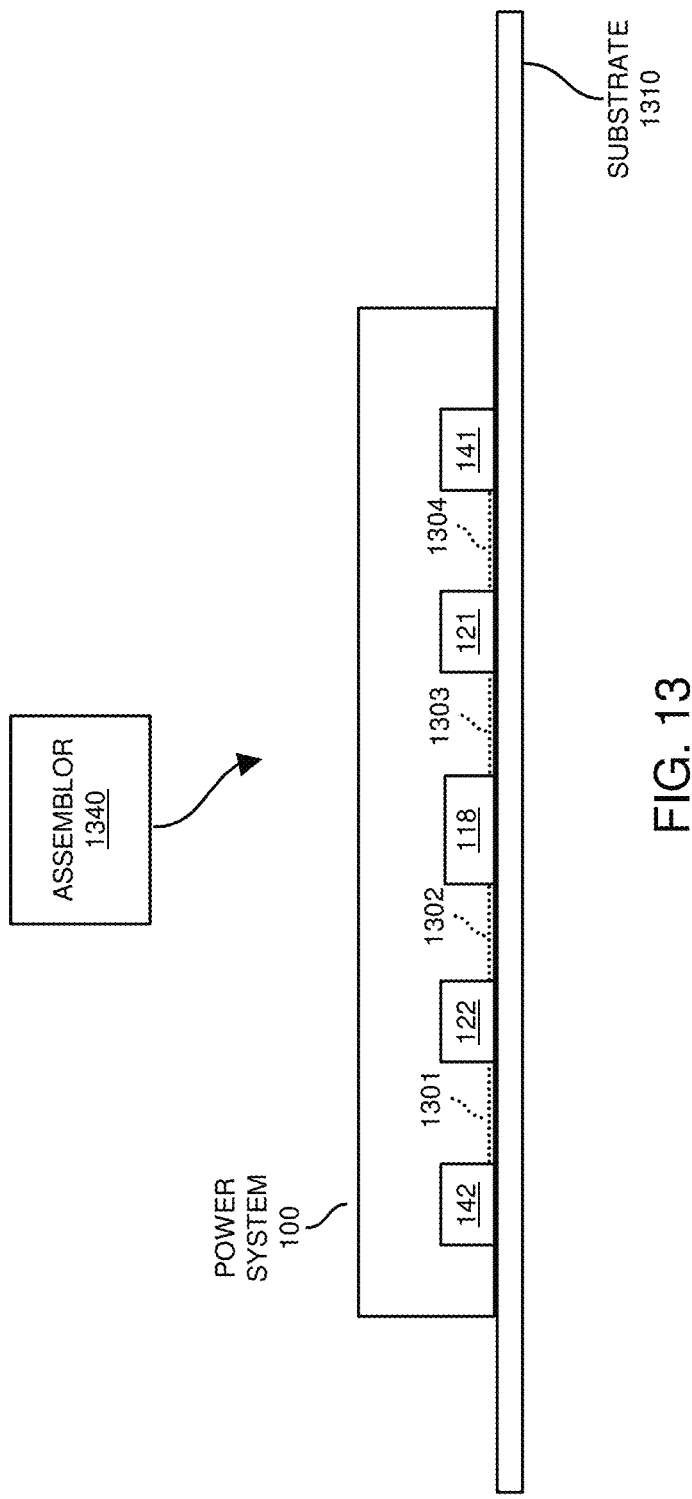
FIG. 13 is an example diagram illustrating assembly of a circuit according to embodiments herein.

FIG. 13 is an example diagram illustrating assembly of a power supply and multiple interconnected power converter phases on a circuit board according to embodiments herein.

In this example embodiment, assembler 1340 receives a substrate 1310 and corresponding components of power system 100 in which to affix one or more components such as controller 141, power converter 121, controller 142, power converter 122, and dynamic load 118, etc. The assembler 1340 affixes (couples) each of these circuits, etc., onto the substrate 1310.

Via respective circuit paths 1301, 1302, 1303, 1304, etc., as described herein, the assembler 1340 provides connectivity between a respective controller and power converter and dynamic load.

Note that components such as associated with the power converters, controllers, etc., can be affixed or coupled to the substrate 1310 in any suitable manner. For example, one or more of the components associated with the power converter 121, power converter 122, controller 141, controller 142, dynamic load 118, etc., can be soldered to the substrate 1310, inserted into sockets disposed on the substrate 1310, etc.

Note further that the substrate 1310 is optional. Any of one or more circuit paths or connectivity as shown in the drawings and as described herein can be disposed in cables or other suitable medium.

In one nonlimiting example embodiment, one or more of the controllers, power converters, dynamic load 118, etc., are disposed on their own substrate independent of substrate 1310; the substrate of the dynamic load 118 is directly or indirectly connected to the substrate 1310 via wires, cables, links, etc. The power converters or any portion of the power supply controller and corresponding power converter phases as well as any other components as discussed herein can be disposed on a standalone smaller board plugged into a socket of the substrate 1310 as well.

Via one or more circuit paths 1301, 1302, 1303, etc., (such as one or more traces, cables, connectors, wires, conductors, electrically conductive paths, etc.), the assembler 1340 couples the respective controllers and power converters. The circuit paths 1302 and 1303 provide connectivity between the power converters and the dynamic load 118.

Accordingly, embodiments herein include a system comprising: a substrate 1310 (such as a circuit board, standalone board, mother board, standalone board destined to be coupled to a mother board, host, etc.); power converters 121, 122, etc., including corresponding components as described herein; and controllers 141, 142.

Note again that each of the loads 118 or collection of dynamic loads can be any suitable circuit or hardware such as one or more CPUs (Central Processing Units), GPUs (Graphics Processing Unit) and ASICs (Application Specific Integrated Circuits such those including one or more Artificial Intelligence Accelerators), which can be located on the substrate 1310 or disposed at a remote location.

Note again that techniques herein are well suited for use in circuit applications such as those implementing power conversion. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
a controller operative to:
monitor a magnitude of first current supplied by a first power converter to power a dynamic load, an output voltage of the first power converter supplying the first current to power the dynamic load;
control a second power converter to supply second current through the dynamic load based on the magnitude of the first current supplied by the first power converter to power the dynamic load; and
wherein the first power converter is disposed closer to the load than the second power converter.

2. The apparatus as in claim 1, wherein the first power converter is operative to regulate the output voltage with respect to a desired reference voltage; and
wherein the second power converter uses the monitored magnitude of the first current to control a magnitude of the second current supplied from the second power converter.

3. The apparatus as in claim 1, wherein the controller is operative to:
compare the magnitude of the first current to a target current reference value; and
control operation of the second power converter and generation of the second current based on the comparison.

4. The apparatus as in claim 3, wherein the controller is further operative to:
adjust a magnitude of the second current such that a difference between the magnitude of the first current supplied from the first power converter and the target current reference value is biased toward zero.

5. The apparatus as in claim 1, wherein the controller is further operative to:
adjust a magnitude of the second current supplied from the second power converter such that a magnitude of the first current from the first power converter is biased toward zero.

6. The apparatus as in claim 1, wherein the controller is further operative to:
implement a control loop of the second power converter to operate in a current control mode to produce the second current.

7. The apparatus as in claim 1, wherein the controller is further operative to:
implement a control loop of the second power converter to operate in a voltage control mode to produce the second current.

8. The apparatus as in claim 1, wherein a ratio of first power supplied by the first power converter to the load via the first current is substantially greater than second power supplied by the second power converter to the load via the second current during transient load conditions; and
wherein the ratio of the first power supplied by first power converter to the load via the first current is substantially less than the second power supplied by the second power converter to the load via the second current during non-transient load conditions.

9. The apparatus as in claim 1, wherein the controller is further operative to vary a number of phases activated in the first power converter and the second power converter depending on a magnitude of power consumption by the load.

10. A system comprising:
a circuit substrate; and
the apparatus of claim 1, the apparatus coupled to the circuit substrate.

11. A method comprising:
receiving a circuit substrate; and
coupling the controller of claim 1 to the circuit substrate.

12. The apparatus as in claim 1 further comprising:
a substrate;
wherein the first power converter is disposed between the dynamic load and the substrate.

13. The apparatus as in claim 12, wherein the second power converter is affixed to the substrate adjacent a combination of the dynamic load and the first power converter.

14. The apparatus as in claim 1, wherein the first power converter is disposed directly beneath the dynamic load.

15. The apparatus as in claim 1 further comprising:
a substrate; and
wherein the first power converter is disposed on a first side of the substrate and the second power converter is disposed on a second side of the substrate.

16. The apparatus as in claim 15, wherein the first power converter is disposed between the substrate and the dynamic load.

17. The apparatus as in claim 15 further comprising:
an interposer coupled to the substrate; and
wherein the first power converter and the dynamic load are disposed on the interposer.

18. The apparatus as in claim 15, claim 1 further comprising:
an interposer; and
wherein the interposer is disposed between the substrate and the dynamic load.

19. The apparatus as in claim 15, wherein the second power converter is affixed to the substrate adjacent a combination of the dynamic load and the first power converter.

20. The apparatus as in claim 1 further comprising:
a substrate; and
an interposer disposed between the substrate and a combination of the dynamic load and the first power converter.

21. The apparatus as in claim 20, wherein the interposer is disposed on a first side of the substrate and the second power converter resides on a second side of the substrate.

22. An apparatus comprising:
a controller operative to:
monitor a magnitude of first current supplied by a first power converter to power a dynamic load, an output voltage of the first power converter supplying the first current to power the dynamic load;
control a second power converter to supply second current through the dynamic load based on the magnitude of the first current supplied by the first power converter to power the dynamic load; and
via a clamp function in a control loop of the second power converter, limit a magnitude of the second current supplied from the second power converter to the load;
wherein the first power converter includes a first set of power converter phases to supply the first current to the dynamic load;
wherein the second power converter includes a second set of power converter phases to supply the second current to the dynamic load; and
wherein the controller is further operative to: i) balance respective current supplied by each of the power converter phases in the first set, and ii) balance respective current supplied by each of the power converter phases in the second set.

23. An apparatus comprising:
a controller operative to:
monitor a magnitude of first current supplied by a first power converter to power a dynamic load, an output voltage of the first power converter supplying the first current to power the dynamic load;
control a second power converter to supply second current through the dynamic load based on the magnitude of the first current supplied by the first power converter to power the dynamic load; and
wherein the first power converter is disposed in a stacked configuration with respect to the load.

24. A method comprising:
monitoring a magnitude of first current supplied by a first power converter to power a dynamic load, an output voltage of the first power converter supplying the first current to power the dynamic load; and
controlling a second power converter to supply second current through the dynamic load based on the monitored magnitude of first current supplied by the first power converter to power the dynamic load; and
wherein the first power converter is disposed closer to the load than the second power converter.

25. The method as in claim 24, wherein the first power converter is operative to regulate the output voltage with respect to a desired reference voltage, the method further comprising:
via the second power converter, using the monitored magnitude of the first current to control a magnitude of the second current supplied from the second power converter.

26. The method as in claim 24 further comprising:
comparing the magnitude of the first current to a target current reference value; and
controlling operation of the second power converter and generation of the second current based on results of the comparing.

27. The method as in claim 26 further comprising:
adjusting a magnitude of the second current such that a difference between the magnitude of the first current supplied from the first power converter and the target current reference value is biased toward zero.

28. The method as in claim 24 further comprising:
adjusting a magnitude of the second current supplied from the second power converter such that a magnitude of the first current from the first power converter is biased toward zero.

29. The method as in claim 24 further comprising:
via a clamp function in a control loop of the second power converter, limiting a magnitude of the second current supplied from the second power converter to the load.

30. The method as in claim 24 further comprising:
implementing a control loop of the second power converter to operate in a current control mode to produce the second current.

31. The method as in claim 24 further comprising:
implementing a control loop of the second power converter to operate in a voltage control mode to produce the second current.

32. The method as in claim 24, wherein the first power converter is disposed in a stacked configuration with respect to the load.

33. The method as in claim 24, wherein a ratio of first power supplied by the first power converter to the load via the first current is substantially greater than second power supplied by the second power converter to the load via the second current during transient load conditions; and
wherein the ratio of the first power supplied by first power converter to the load via the first current is substantially less than the second power supplied by the second power converter to the load via the second current during non-transient load conditions.

34. The method as in claim 24 further comprising:
varying a number of phases activated in the first power converter and the second power converter depending on a magnitude of power consumption by the load.

* * * * *

UNITED STATES PATENT AND TRADEMARK OFFICE
CERTIFICATE OF CORRECTION

| | |
|---|---|
| PATENT NO. | : 11,594,961 B2 |
| APPLICATION NO. | : 17/379191 |
| DATED | : February 28, 2023 |
| INVENTOR(S) | : Darryl Tschirhart and Danny Clavette |

It is certified that error appears in the above-identified patent and that said Letters Patent is hereby corrected as shown below:

In the Claims

Claim 18, Line 1, delete "claim 1"

Signed and Sealed this
Thirteenth Day of June, 2023

*Katherine Kelly Vidal*

Katherine Kelly Vidal
*Director of the United States Patent and Trademark Office*